United States Patent [19]

Canales

[11] Patent Number: 5,354,150
[45] Date of Patent: Oct. 11, 1994

[54] TECHNIQUE FOR MAKING UP THREADED PIPE JOINTS INTO A PIPELINE

[76] Inventor: Joe M. Canales, P.O. Box 6, Benavides, Tex. 78341

[21] Appl. No.: 14,851

[22] Filed: Feb. 8, 1993

[51] Int. Cl.5 ............................................. F16L 1/00
[52] U.S. Cl. .................................. 405/154; 405/158; 405/169; 166/77.5
[58] Field of Search ...................... 405/154, 169–171, 405/303; 294/104, 74; 166/77.5; 29/237, 456; 414/747, 460, 745.4, 745.5, 745.6

[56] References Cited

U.S. PATENT DOCUMENTS

| | | | |
|---|---|---|---|
| 2,615,681 | 10/1952 | True | 166/77.5 |
| 2,780,376 | 2/1957 | Sanders | 405/170 X |
| 3,464,507 | 9/1969 | Alexander et al. | 166/77.5 X |
| 4,286,914 | 9/1981 | Davidson | 405/170 X |
| 4,361,435 | 12/1982 | Henry | 405/154 |
| 4,423,774 | 1/1984 | Mefford | 166/77.5 |
| 4,553,301 | 11/1985 | Hattori | 29/237 |
| 5,092,399 | 3/1992 | Lang | 166/77.5 |

*Primary Examiner*—Dennis L. Taylor
*Attorney, Agent, or Firm*—G. Turner Moller

[57] ABSTRACT

An apparatus for making up threaded pipeline joints includes conventional casing tongs supported on a truck for movement between a stowed position and an operative position over the side of the truck with the axis of rotation of the casing tongs being generally horizontal. An operator manipulates the support to position the casing tongs over a pipeline joint to be made up and rotates the tong dies to rotate the pipeline joint. A torque gauge is incorporated into a backup wrench to provide a visual signal that the joint is made up. A dolly towed behind the truck supports the made up pipeline a short distance behind the truck and transfers the made up pipeline in a predetermined path as the truck drives down the pipeline right-of-way as the threaded joints are made up. A dope applier is cantilevered from the dolly and applies dope to the pipeline when the truck moves along the right-of-way.

29 Claims, 6 Drawing Sheets

TECHNIQUE FOR MAKING UP THREADED PIPE JOINTS INTO A PIPELINE

This invention is a method and apparatus for making up threaded pipe joints and stringing the made up joints in the process of laying a pipeline.

Although most oil and gas pipelines are made up from pipe joints that are welded together, many small diameter lines gas pipelines comprise threaded joints. A typical threaded pipeline connects one or two gas wells to a larger welded pipeline and is less than a few miles long. Threaded pipe joints may either be new line pipe or used well tubing, usually $2\frac{3}{8}''$ OD or $2\frac{7}{8}''$ OD. Although most threaded pipe is doped and wrapped, it is not unusual to lay bare pipe in a ditch or on the top of the ground.

Most line pipe joints are 30–40' long and most well tubing joints are nominally 30' long. Manually making up such joints is a physically demanding chore requiring a crew of five or six. Typically, the threaded joints are strung along the pipeline right-of-way parallel to the ditch or path in which the pipeline is to be laid. Although the pipeline could theoretically be made up with the collar of one joint screwed onto the pin of the preceding joint, the pin of one joint is almost always screwed into the collar of the preceding joint. As used herein, threading one joint onto another joint includes either situation.

One crew member places a board a foot or so tall near the collar of a first joint to be screwed into. This raises the joint to a convenient working height. A pipe wrench, usually a 24" Stilson, is placed as a backup to prevent the first joint from turning. The joint to be made up is stabbed into the collar and the free end is supported by a pole having one or more V-shaped notches thereon. The joint is rotated relatively rapidly by a gripping device having an offset handle, much like an old fashioned crank handle for an automobile starter, with the pole being raised or lowered to align the two joints and allow the threads to make up without cross-threading. Several men, using pipe wrenches, continue to tighten the joint until it cannot be turned further. After the threads are made up as much as possible, the board under the preceding joint is removed and placed near the collar of the joint just made up. Working very hard and very long, a crew can make up perhaps a mile of threaded 2" pipe a day.

Disclosures of general interest are found in U.S. Pat Nos. 1,522,408; 4,093,082; 4,345,493 and 4,362,435.

In this invention, much of the physical labor is done by conventional casing tongs of the type used to thread joints of casing together when they are being run into a well extending into the earth. Casing tongs include a housing and a rotatable C-shaped member providing aligned notches through which the pipe joint enters and exits, a plurality of pipe gripping devices known as dies in the C-shaped member, and a motor for turning the C-shaped member and dies. Casing tongs are usually hydraulically powered and comprise a heavy piece of equipment. Casing tongs are typically suspended in the derrick of a drilling rig when in use so the axis of rotation through the C-shaped member is vertical. Casing tongs are made by a number of manufacturers, such as BJ-Hughes, Inc. and Eckel Manufacturing Co.

In this invention, casing tongs are mounted vertically on a truck. The tongs are movable from a central stowed position to an operating position on one side of the truck so the axis is horizontal and parallel to the direction of travel of the truck. The preceding joint is supported in a fixture on the side of the truck and a backup wrench is laid on the preceding joint. The joint to be made up is stabbed into the collar of the preceding joint. The tongs are moved vertically to position the C-shaped member on the more-or-less horizontal joint to be made up. The tongs are then actuated to turn the joint and thread it onto the preceding joint. When the joint is rotated to a predetermined torque, the casing tongs are stopped and then removed from the joint and the process is repeated with each successive joint. Experience with this invention has shown that pipe joints of about $2''-2\frac{7}{8}''$ O.D. can be threaded together at a sustained rate of one joint per minute or about 1800'/hour.

Trailing along behind the truck is a wheeled dolly through which the made up pipeline extends. The dolly provides a support for the pipeline a half joint or so behind the truck. The dolly holds the made up pipeline in a more-or-less horizontal position and strings the made up pipeline in a predetermined path. By starting the dolly and truck at a location straddling the ditch, the dolly can be arranged to transfer the pipeline into the ditch. An implement on the dolly can be used to dope the threaded pipeline, i.e. apply a thick mastic or coating material that is of a type to retard corrosion.

It is an object of this invention to provide an improved method and apparatus for making up threaded pipelines.

Another object of this invention is to provide accessories which allow a conventional set of casing tongs to be used to make up threaded pipelines.

A further object of this invention is to provide a dolly for trailing along behind a device for threading pipeline joints together for stringing the made up pipeline in a desired path.

These and other objects of this invention will become more fully apparent as this description proceeds, reference being made to the accompanying drawings and appended claims.

Referring to FIGS. 1–4, there is illustrated a pipeline 10 being made up from a plurality of threaded joints by an apparatus 12 of this invention. The apparatus 12 comprises a set of conventional casing tongs 14 mounted on a truck 16 and a wheeled dolly 18 towed by the truck 16 by a flexible line 20 such as chain or cable. The made up joints of the pipeline 10 are supported on the wheeled dolly 18 tethered behind the truck 16. Thus, when the truck 16 moves down the pipeline right-of-way to make up the next joint, the dolly 18 transfers the made up joints to either the ground surface or to a ditch 24 in which the pipeline is to be buried.

The casing tongs 14 are of any suitable type customarily used to thread casing joints together when running them into a well bore extending into the earth. Conventional casing tongs 14 comprise a housing 26 having a radial slot 28 therein and a C-shaped section 30 having a slot 32 registerable with the slot 28. One or more dies 34 in the section 30 grip the exterior of the pipe joint to be turned. A motor 36, usually hydraulically driven, rotates the section 30 to close the end of the slot 28 and thereby captivate the pipe joint in the section 30. The motor 36 turns the pipe joint until the motor 36 stalls or until the operator shuts it off.

The casing tongs 14 are mounted on a support or mast 38 attached to the truck 16. The mast 38 includes a stationary tubular member 40 having a base 42 secured to the truck 16 near one side of the truck 16 in any suitable fashion, as by suitable threaded fasteners (not shown) and one or more inclined struts 44. A tubular member or mast end 46 is rotatably and telescopingly received by the member 40 and includes a pair of rigid collars 48 receiving a rotatable lubricated sleeve 50 therebetween. The member 46 is raised and lowered by a suitable extensible motor 52 attached to the sleeve 50. A telescoping arm 54 is pivotally attached to the member 46 in any suitable manner, as by the provision of a pin 56. The arm 54 includes an inboard tubular member 58 telescoping receiving an outboard member 60 having a fixture 62 thereon from which the casing tongs 14 hang. A suitable extensible motor 64 allows the arm 54 to be extended and retracted. Another suitable extensible motor 66 extends between the mast end 46 and the end of the inboard tubular member 58 for pivoting the arm 54 about the axis of the pin 56.

Figure 3:
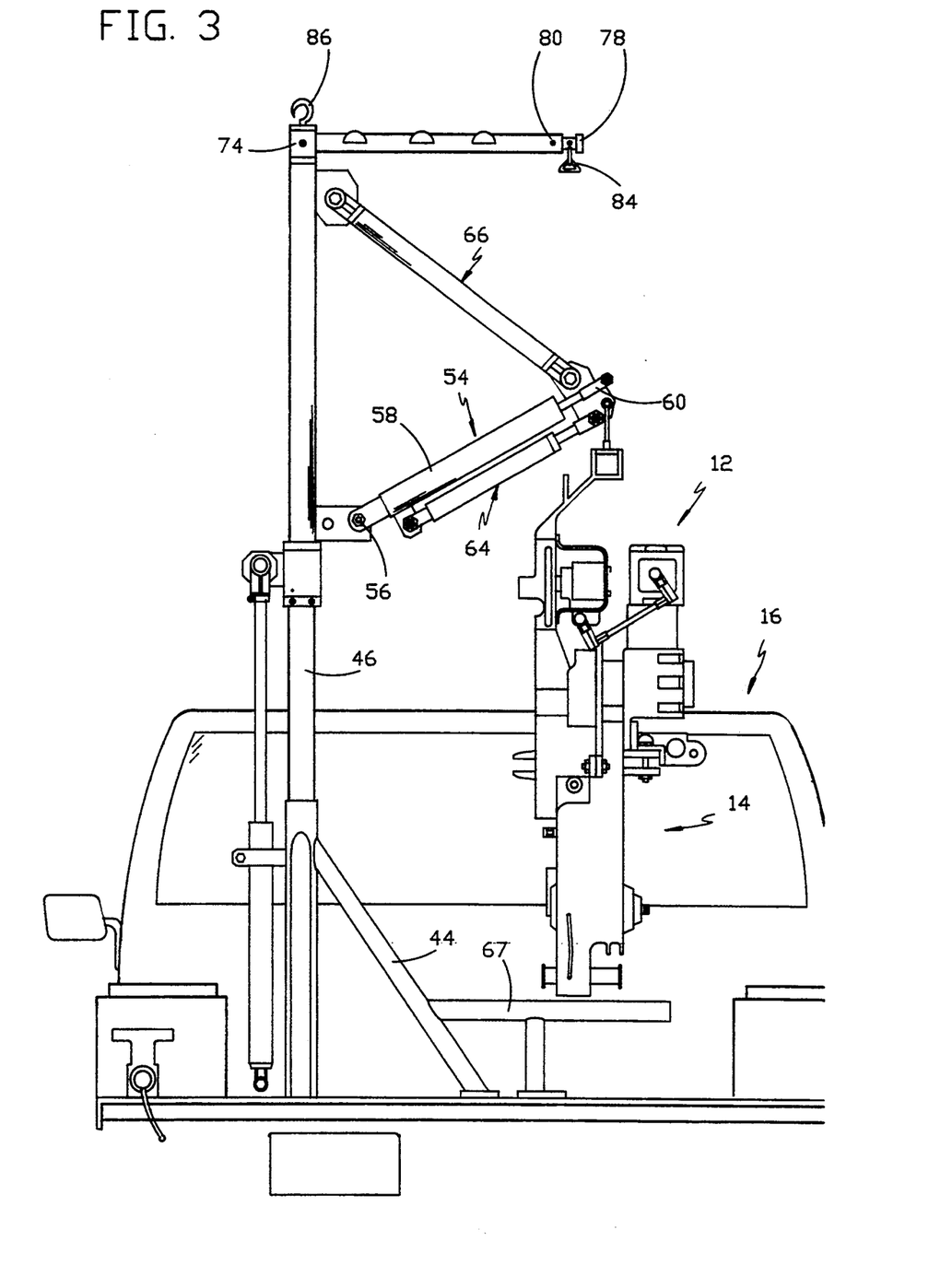
FIG. 3 is an end view of the vehicle shown in FIG. 1 with the casing tongs in a position over the vehicle ready to be stowed.
Figure 4:
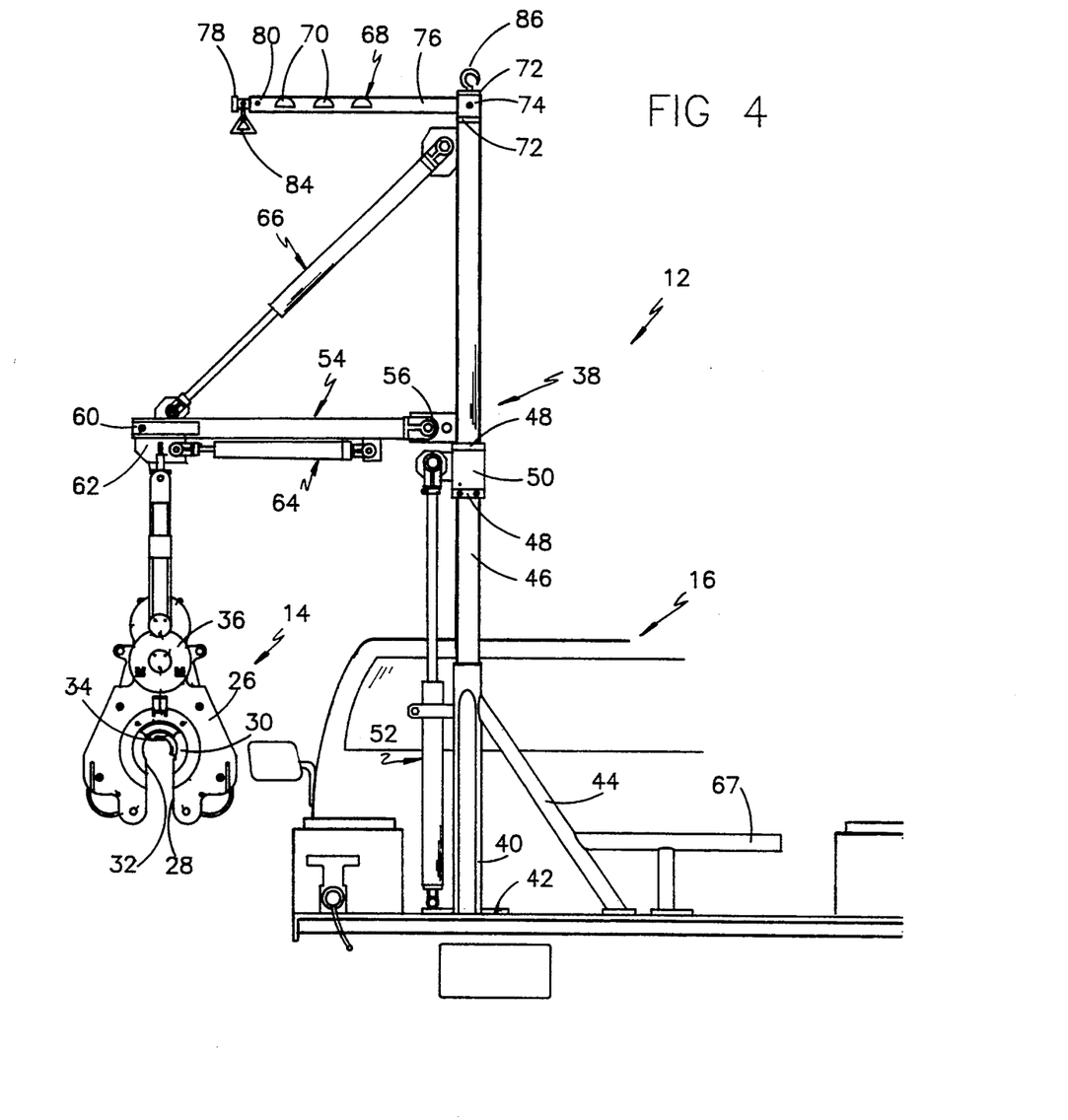
FIG. 4 is a partial end view of the vehicle shown in FIGS. 1-3 with the casing tongs over the side of the vehicle in an operative position.

It will accordingly be seen that the mast 38 supports the casing tongs 14 for movement between a stowed position over the center of the truck 16 and an operative position off the side of the truck 16. The mast end 46 is easily manually rotated in the member 40 to move the tongs 14 from the stowed to the operative position. Conveniently, the tongs 14 are attached to a bar 67 in the stowed position so the tongs 14 do not swing during normal travel of the truck 16.

A second telescoping radial arm 68 is rotatably supported on the top of the mast end 46 to support an umbrella (not shown) and/or a bank of lights 70. A pair of rigid collars 72 are affixed to the mast end 46 and a rotatable lubricated sleeve 74 is positioned between the collars 72. The arm 68 accordingly includes an inboard tubular member 76 and an outboard telescoping member 78. A series of openings 80 in the members 76, 78 and a pin (not shown) secure the arm in one of a plurality of telescoping positions to place the umbrella or lights in a position to shade or illuminate the work area near the side of the truck 16. An umbrella handle receiving fixture 84 is universally mounted on the end of the member 78 to orient the umbrella in any desired direction.

It will be seen that the truck 16 may be used for different purposes because it is easy to remove the mast 38 and tongs 14 from the truck 16. The truck 16 is driven under a suitable support, such as a building rafter having an eye (not shown) to receive a hook 86 on the mast end 46. The motor 52 raises the mast end 46 to position the hook 86 in the eye. The threaded fasteners attaching the base 42 to the truck are then removed and the motor 52 is retracted to lift the mast 38 from the truck 16. The hydraulic connections to the various motors are removed and the truck 16 is then driven off.

Figure 1:
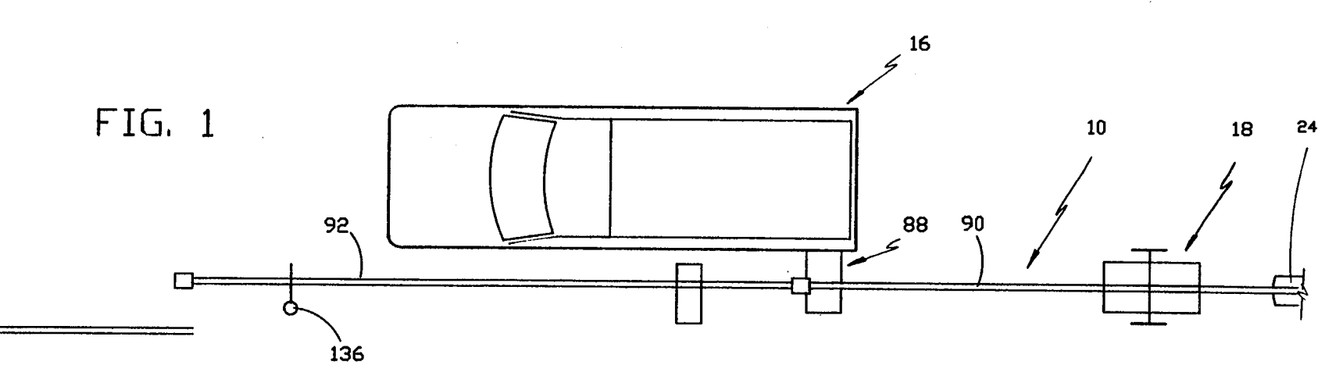
FIG. 1 is a top view of a pipeline laying operation in accordance with this invention.
Figure 2:
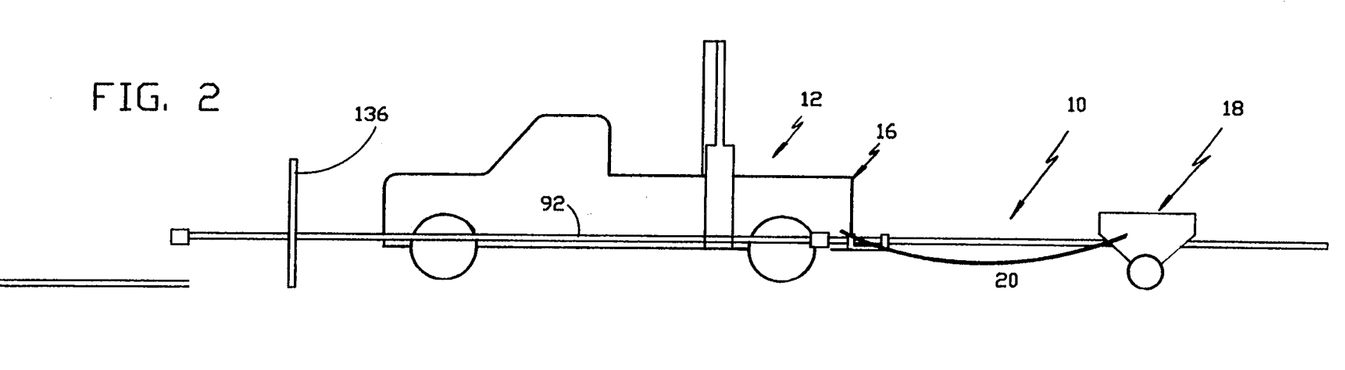
FIG. 2 is a side elevational view of the pipeline laying operation of FIG. 1.
Figure 5:
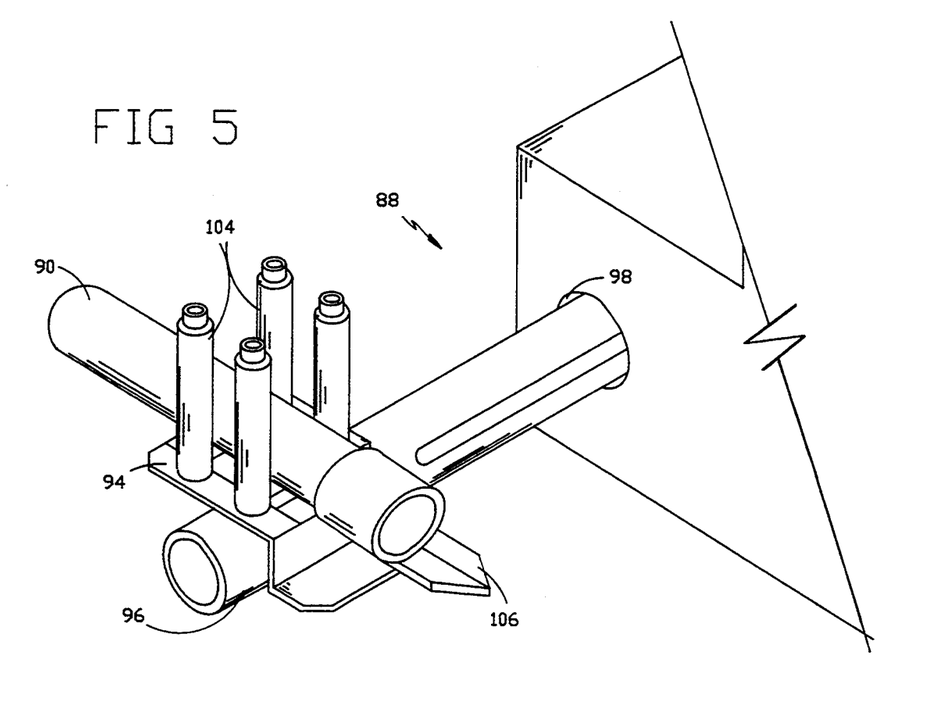
FIG. 5 is an enlarged isometric view of the fixture holding the collar of the preceding joint.

Referring to FIGS. 1 and 5, a support 88 is mounted on the truck 16 for holding the collar of a threaded pipe joint 90 into which a joint 92 will be threaded. The support 88 is preferably removably or retractably mounted on the truck 16. To this end, the support 88 includes a frame 94 mounted on a rail 96 telescopingly received in a track 98 extending across the underside of the truck 16. An extensible motor (not shown) includes a piston rod for moving the rail 96 outwardly thereby positioning the support 88 where threading is done away from the truck 16. If desired, a removable strut or tether 102 (FIG. 6) may extend from the truck 16 to the frame 76 to stabilize the support 88. The frame 94 includes two spaced pair of upright rollers 104 receiving the pipe joint 90 therebetween and an upwardly facing trough 106.

Figure 6:
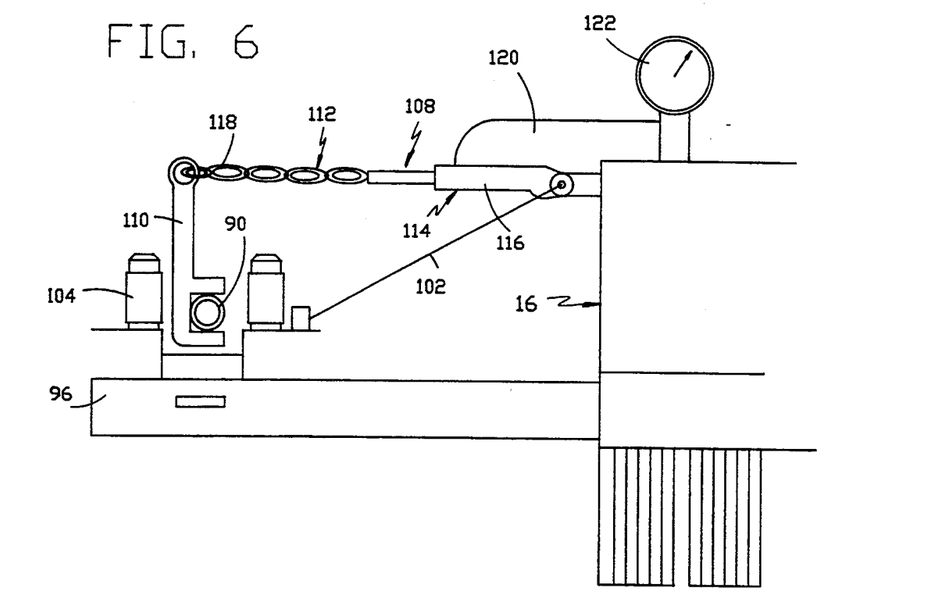
FIG. 6 is an enlarged view of the backup wrench and torque measuring device.

Referring to FIG. 6, a back up wrench assembly 108 is provided to prevent the joint 90 from rotating in response to driving the casing tongs 14. The assembly 108 includes a pipe gripping device 110, such as a pipe wrench, attached to the truck 16 through a strut 112. Preferably, the strut 112 includes a torque measuring device 114 such as a hydraulic cylinder 116 pivotally connected at one end to the truck 16 and at the other end to the wrench 110, as by use of a chain 118. The cylinder 116 includes a hose connection 120 leading to a large gauge 122 visible to the casing tongs operator. The length of the handle of the pipe wrench 110 is selected so the gauge 122 displays torque in commonly acceptable units, such as foot pounds.

Figure 7:
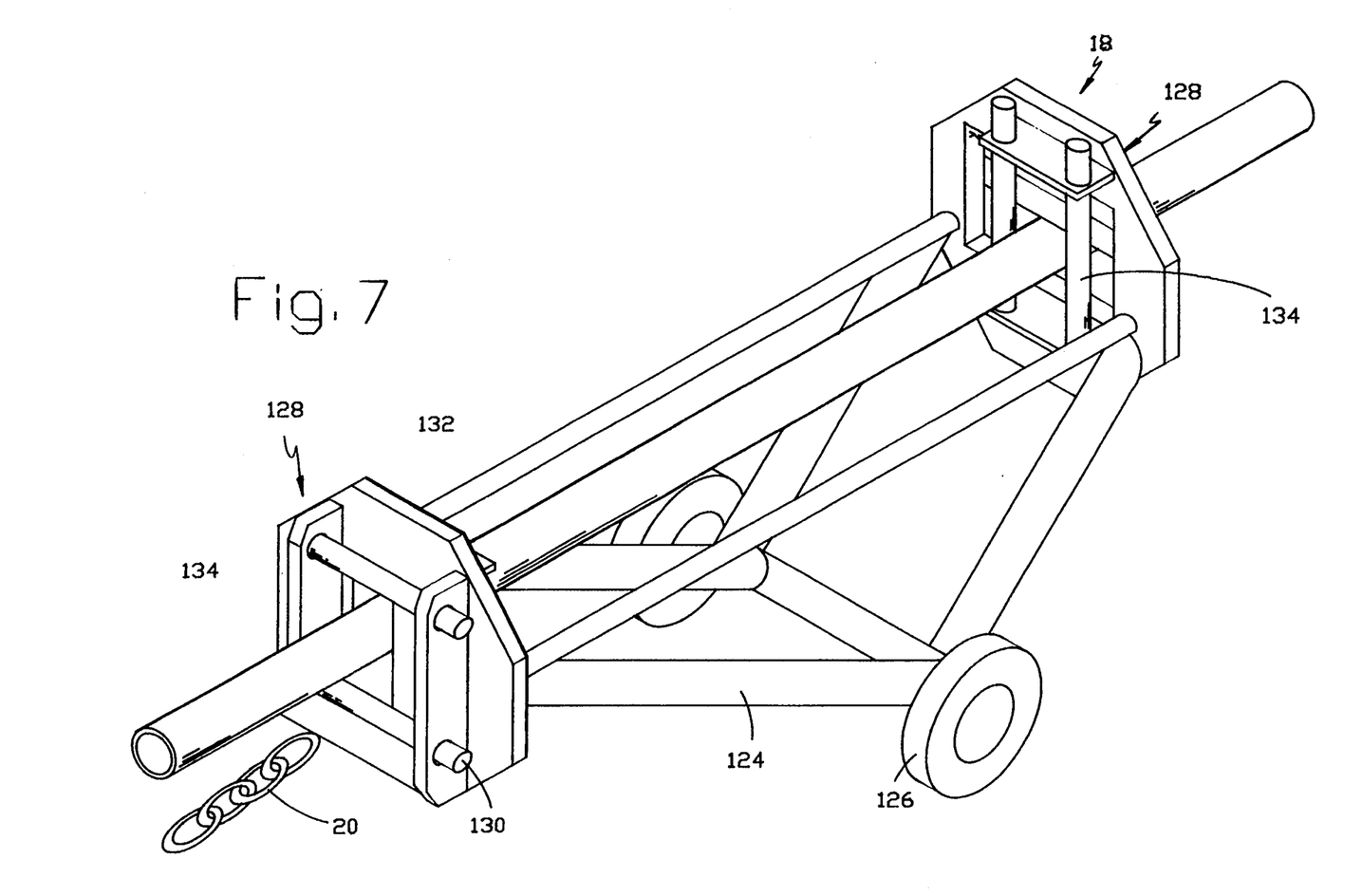
FIG. 7 is an isometric view of a wheeled dolly trailing along behind the vehicle.

Referring to FIG. 7, the wheeled dolly 1S is shown in greater detail. The dolly 18 comprises an upwardly diverging V-shaped frame 124 having wheels 126 at the bottom and a pair of pipe constraints 128 spaced fore and aft. The pipe constraints 128 each include one or more horizontal rollers 130 supporting the made up pipe joints and one or more spaced horizontal rollers 132 preventing upward movement of the made up pipe joints. A vertical guide for the made up pipe joints includes spaced vertical rollers 134.

The dolly 18 is tethered behind the truck 16 by the chain or cable 20 a suitable distance to support the made up pipe joints in a more-or-less horizontal position. The exact position depends on the stiffness of the pipe being made up and will usually be about one half of one pipe joint. If the joint 90 is not level in the support 88, the cable 20 may be payed out or taken in. When the truck 16 is driven from one made up joint to the next joint to be threaded together, the dolly 18 follows along behind to support the made up joints and to transfer the pipeline to the ground in a predetermined path. If it were desired to transfer the pipeline directly to the ditch 24, it may be desirable for the truck 16 or the dolly 18 to straddle the ditch 24. In any event, the made up pipeline exits from the dolly 18 onto the ground paralleling the right-of-way or direction driven by the truck 16.

Operation of the device 12 of this invention should now be apparent. One or two joints of the pipeline are made up so they extend through the pipe constraints 128 with the last made up joint 90 being positioned in the support 88. The pin end of the next joint 92 to be made up is placed in the collar of the joint 90. The joint 92 is leveled by a worker using a pipe jack 136 in a conventional manner so the threads will mesh and not cross-thread. The tongs operator manipulates the extensible motor 52 to lower the tongs 14 so the pipe joint 92 passes through the aligned slots 28, 32. The tongs 14 are then actuated to rotate the joint 92 and thereby thread the joints 90, 92 together. By watching the gauge 122, the operator can see when to stop the tongs 14. In the alternative, the bypass (not shown) on the tongs 14 may be set to deliver the desired torque to the pipe joint 92. When the joints 90, 92 are made up, the tongs operator reverses rotation of the C-shaped member 30 thereby realigning the slots 28, 32 so the tongs 14 may be elevated off the pipe by actuating the motor 52. The truck 16 is then driven to the end of the newly made up joint so the collar lies in the support 88. The dolly 18 follows along and supports the made up pipeline joints in a more-or-less horizontal position so the next joints can be made up.

Sometimes, threaded line pipe is laid on top of the ground or in a ditch without being doped or wrapped. More often, line pipe is doped in a pipe yard with a corrosion resistant tar like substance or doped and then wrapped with a tough paper. When well tubing is being used as line pipe, it is often doped in the field after being made up by smearing a tar like coating material on the pipe with gloves or mittens. This is a separate operation and may take as much time and effort as the making up operation.

Referring to FIGS. 8-13, another feature of the invention is illustrated where the doping operation is conducted more-or-less automatically at the end of the pipe threading operation. The pipeline 10 extends through the dolly 18 and through a dope applier 138. The dope applier 138 includes, as major components, a receptacle 140 having a lid 142, an inlet structure 144, an outlet structure 146 and means 148 for supporting the receptacle 140.

Figure 8:
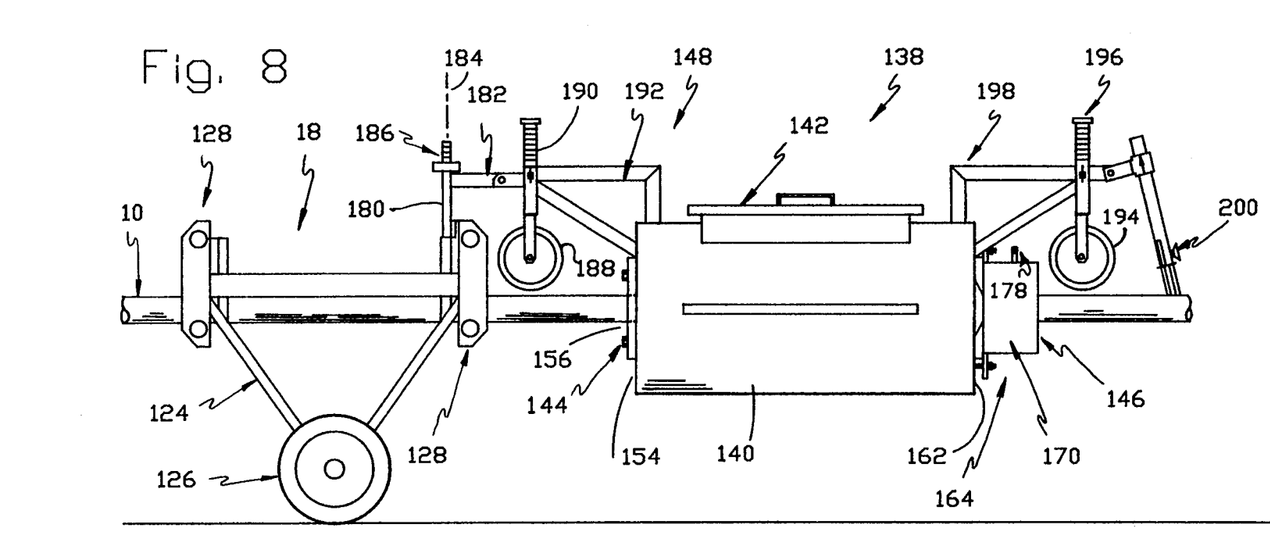
FIG. 8 is a side elevational view of a pipe doping device.
Figure 9:
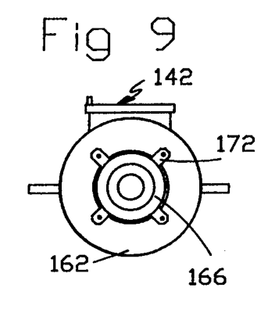
FIG. 9 is an end view of the pipe doping device of FIG. 8.
Figure 10:
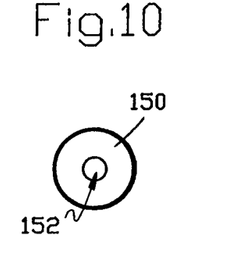
FIG. 10 is a view of a wiper in the inlet end of the dope container.
Figure 11:
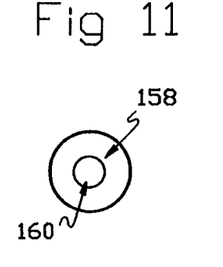
FIG. 11 is a view of a wiper used in the outlet end of the dope container.
Figure 12:
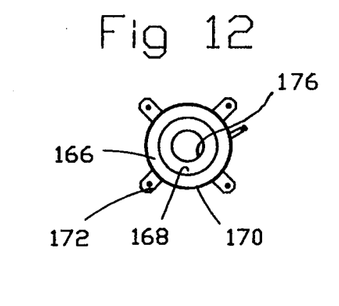
FIG. 12 is an end view of a fitting used in the outlet end of the dope container.
Figure 13:
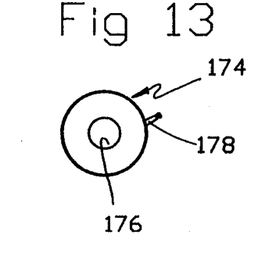
FIG. 13 is a view of an inflatable wiper used in the fitting in the outlet end of the dope container.

The receptacle 140 is sized to receive a substantially quantity of dope so the pipeline 10 is covered by the material during its movement through the receptacle. Thus, one or more workers periodically pour the dope through the opening covered by the lid 142 during the pipe make up operation.

The inlet structure 144 inlcues an annular wiper 150 (FIG. 10) made of rubber or rubber like material having a central opening 152 smaller than the outer diameter of the pipeline 10. The wiper 150 is captivated around an inlet opening in the receptacle end wall 154 by a cover plate 156. The wiper 150 accordingly prevents seepage of the dope through the inlet end of the receptacle 140.

The outlet structure 146 includes a wiper 158 (FIG. 11) having a control opening 160 larger than the outer diameter of the pipeline 10 and thereby allows the dope material to flow around the outside edge. The wiper 158 is captivated around an outlet opening in the receptacle end wall 162 by a fitting 164 (FIG. 12) comprising an end wall 166 having an opening 168 therein, a cylindrical wall 170 having a plurality of ears 172 and fasteners (not shown) securing the fitting 164 to the end wall 162.

Inside the fitting 164 is an inflatable toroidal structure, such as a tire inner tube 174 (FIGS. 11-13) having a central opening 176 and a valve stem 178. The inner tube 174 and the cylindrical wall 170 are sized so the inner tube 174 seals against the wall 170 in a normal inflated condition. Air is added to the inner tube 174 to decrease the size of the opening 176 and thereby reduce the amount of dope applied to the pipeline 10 or air may be withdrawn from the inner tube 174 to enlarge the opening 178 while maintaining a seal against the cylindrical wall 170. If the making up operation has stopped for an appreciable length of time, it may be desirable to pressure up on the inner tube 174 and wholly shut off the flow of dope through the outlet structure 146.

The supporting means 148 is sufficient to support the receptacle 140 from the dolly 18 in a position where the pipeline 10 extends through the openings in the receptacle end walls 154, 162. To this end, the supporting means 148 includes an upstanding post 180 on the dolly 18 mounting a trailer arm 182 for pivotal movement about an upstanding axis 184 and for up and down movement against a spring 186. The trailer arm 182 carries a wheel 188 running on the exterior of the pipeline 10 to support the forward end of the dope receptacle 140. The wheel 188 is preferably vertically adjustable by a screw mechanism 190 to adjust the relative position of the dope receptacle 140 and the dolly 18. A plurality of struts 192 connect the screw mechanism 190 and the receptacle 140. The supporting means 148 also includes a rear wheel 194 running on the exterior of the pipeline 10 and being vertically adjustable by a screw mechanism 196. A plurality of struts 198 connect the screw mechanism 196 and the dope receptacle 140. A wiper brush assembly 200 is used to respread dope on top of the pipeline 10 and thereby repair the marks left by the trailing wheel 194.

Operation of the dope applier 138 should now be apparent. When one of the joints is being made up, the truck 16, the dolly 18 and the dope applier 138 are stationary. Thus, workers can add dope material to the receptacle 140 if needed. When the truck 16 moves, it moves one joint length, usually 30-40', and pulls the dolly 18 and the dope applier 138 with it. The inlet wiper 150 prevents dope leaking through the front end of the dope receptacle 140. As the pipeline 10 moves through the dope receptacle 138, at a location below the level of dope therein, some of the dope material adheres to the pipeline 10 when it passes through the outlet wiper 158. The opening 160 in the outlet wiper 158 allows some dope material to exit from the receptacle 140 with the pipeline 10 and the inflatable wiper 174 spreads the dope material against the pipeline 10. If the tire mark created by the wheel 194 is not covered over by the brush assembly 200, one of the workers can smear the dope material with a glove or mitten, in the same manner that dope is now applied.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

I claim:

1. Apparatus for making up threaded pipe joints into a pipeline, comprising a vehicle having a plurality of wheels and a direction of movement;
a mast on the vehicle;
a set of casing tongs having a movable central C-shaped member providing an axis, a pipe die for gripping a pipe joint and rotating the pipe joint about the axis; and
means suspending the casing tongs from the mast with the axis being
generally horizontal,
spaced from the vehicle and
extending in the direction of movement of the vehicle.

2. The apparatus of claim 1 further comprising a backup wrench tethered to the vehicle for connection to the pipeline onto which the first mentioned pipe joint is to be threaded.

3. The apparatus of claim 2 further comprising means for measuring torque applied by the casing joint to the pipe joint including a strut connecting the backup wrench to the vehicle.

4. The apparatus of claim 3 wherein the strut comprises a cylinder having a piston therein and defining a hydraulic filled chamber reduced in volume by the application of force to the backup wrench, and a pressure gauge in communication with the chamber.

5. The apparatus of claim 1 wherein the mast comprises an upright telescoping member and a first linear motor for extending and retracting the telescoping member, wherein the suspending means comprises a telescoping radial arm connected to the member and a second linear motor for extending and retracting the radial arm.

6. The apparatus of claim 5 wherein the telescoping mast comprises a stationary member attached to the vehicle and an extensible member telescoping related to the stationary member, the radial arm is pivotally connected to the extensible member and further comprising a third linear motor for tilting the radial arm relative to the mast.

7. The apparatus of claim 6 wherein the telescoping mast comprises a stationary member and means releasably connecting the stationary member to the vehicle and an extensible member telescopingly related to the stationary member, and further comprising a downwardly opening hook on the extensible member for suspending the apparatus from an overhead support.

8. The apparatus of claim 1 further comprising a fixture attached to the vehicle for supporting a second pipe joint onto which the first mentioned pipe joint is to be threaded.

9. The apparatus of claim 8 wherein the fixture comprises means for horizontally adjustably mounting the fixture on the vehicle.

10. The apparatus of claim 9 wherein the fixture comprises a pair of rollers mounted for movement about horizontally spaced vertical axes, the second joint being positionable between the rollers.

11. The apparatus of claim 1 further comprising a wheeled dolly attached to and trailing along behind the vehicle and having means thereon for supporting the pipeline.

12. The apparatus of claim 11 wherein the dolly comprises a pair of horizontally spaced guides, the pipeline being positionable between the guides.

13. The apparatus of claim 12 wherein the guides comprise rollers mounted for rotation about horizontally spaced vertical axes.

14. The apparatus of claim 12 wherein the dolly comprises a second pair of vertically spaced guides, the pipeline being positionable between the second guides.

15. The apparatus of claim 14 wherein the support means on the dolly comprise rollers mounted for rotation about horizontally spaced vertical axes.

16. The apparatus of claim 12 wherein the support means on the dolly comprises a pair of rollers mounted for movement about vertically spaced horizontal axes, the pipeline being positionable between the rollers.

17. The apparatus of claim 11 further comprising a dope applier towed by the dolly and having a receptacle for receiving a coating material and providing aligned inlet and outlet openings for receiving the pipeline therethrough.

18. The apparatus of claim 17 further comprising means around the inlet opening for preventing loss of the coating material through the inlet opening.

19. The apparatus of claim 18 further comprising means around the outlet opening for controlling the quantity of coating material passing with the pipeline through the outlet opening.

20. The apparatus of claim 18 wherein the controlling means comprises an inflatable toroidal member.

21. The apparatus of claim 17 further comprising means for supporting the receptacle including first and second wheels spaced axially along and abutting the pipeline.

22. The apparatus of claim 21 wherein the supporting means comprises means cantilevering the receptacle from the dolly.

23. A method of making up threaded pipe joints into a pipeline comprising
threading, at a first location with an implement carried on a vehicle, a first joint of pipe onto a second joint of pipe comprising an end of a length of made up joints;
supporting the length of made up joints of pipe, with a wheeled dolly tethered to the vehicle, at a second location away from the first location;
moving the vehicle to a third location and towing the dolly in load supporting relation with the made up joints; and
threading a third joint of pipe onto the first joint of pipe at the third location.

24. The method of claim 23 wherein the threading step comprises placing a pin of the first joint of pipe into a collar of the second joint of pipe and then rotating the first joint of pipe.

25. A method of making up threaded joints into a pipeline extending along a right-of-way, comprising
threading the joints together into a plurality of made up joints with an implement on a vehicle;
moving the vehicle in a path parallel to the right-of-way;
towing a wheeled dolly behind the vehicle; and
supporting the made up joints on the dolly.

26. The method of claim 25 wherein the dolly supports the made up joints at a first location behind the vehicle, the made up joints being generally horizontal from the vehicle to the first location.

27. The method of claim 25 further comprising transferring the made up joints from the dolly to the right-of-way.

28. The method of claim 25 wherein there is a pipeline ditch parallel to the right-of-way and further comprising transferring the made up joints from the dolly to the ditch.

29. The apparatus of claim 1 wherein the suspending means comprises means mounting the casing tongs on the mast for movement between a first stowed position above the vehicle to a second operative position where the axis is generally horizontal, spaced from the vehicle and extending in the direction of movement of the vehicle.

* * * * *